(12) United States Patent
Goerigk et al.

(10) Patent No.: US 6,502,390 B2
(45) Date of Patent: Jan. 7, 2003

(54) METHOD AND SYSTEM FOR FEEDING A REDUCING AGENT INTO A CATALYST DEVICE

(75) Inventors: Christian Goerigk, Fellbach-Oeffingen (DE); Michael Illek, Stuttgart (DE); Stefan Wessels, Weissach (DE)

(73) Assignees: Dr. Ing. h.c.F. Porsche Aktiengesellschaft, Stuttgart (DE); Audi AG, Ingolstadt (DE); Bayerische Motoren Werke Aktiengesellschaft, Munich (DE); DaimlerChrysler AG, Stuttgart (DE); Volkswagen AG, Wolfsburg (DE)

( * ) Notice: Subject to any disclaimer, the term of this patent is extended or adjusted under 35 U.S.C. 154(b) by 0 days.

(21) Appl. No.: 09/924,461

(22) Filed: Aug. 9, 2001

(65) Prior Publication Data

US 2002/0023433 A1 Feb. 28, 2002

(30) Foreign Application Priority Data

Aug. 9, 2000 (DE) .......................... 100 38 741

(51) Int. Cl.[7] ................................ F01N 3/00
(52) U.S. Cl. ............... 60/286; 60/274; 60/301
(58) Field of Search .............. 60/274, 286, 301; 423/235, 236, 237; 44/358

(56) References Cited

U.S. PATENT DOCUMENTS

| 4,175,943 | A | * | 11/1979 | Jordaan et al. ............ 71/36 |
| 5,628,186 | A | | 5/1997 | Schmelz |
| 5,643,536 | A | * | 7/1997 | Schmelz .................. 422/105 |
| 5,800,056 | A | * | 9/1998 | Suzuki et al. ........... 366/152.4 |
| 5,809,774 | A | * | 9/1998 | Peter-Hoblyn et al. ....... 60/274 |
| 5,813,224 | A | * | 9/1998 | Rao et al. ................. 60/286 |
| 5,849,593 | A | * | 12/1998 | Schmelz .................. 436/147 |
| 5,915,636 | A | * | 6/1999 | Caballero ................. 241/73 |
| 6,051,040 | A | * | 4/2000 | Peter-Hoblyn .............. 44/358 |

FOREIGN PATENT DOCUMENTS

| DE | 4315278 A1 | 11/1994 |
| DE | 29708591 U1 | 8/1997 |
| JP | 5272331 | * 10/1993 |
| WO | WO 99/49957 | 10/1999 |

* cited by examiner

Primary Examiner—Thomas Denion
Assistant Examiner—Diem Tran
(74) Attorney, Agent, or Firm—Crowell & Moring LLP

(57) ABSTRACT

The present invention concerns a method and a system for feeding a reducing agent into a catalyst device. A first reservoir is provided and has a solid reducing agent, a second reservoir is provided and has a solvent for the solid reducing agent, and a reducing agent solutions is produced from the solid reducing agent and the solvent. The reducing agent solution is intermittently stored in a third reservoir, and the reducing agent solution is fed from the third reservoir into the catalyst device.

8 Claims, 3 Drawing Sheets

METHOD AND SYSTEM FOR FEEDING A REDUCING AGENT INTO A CATALYST DEVICE

This application claims the priority of German application No. 100 38 741.1, filed Aug. 9, 2000, the disclosure of which is expressly incorporated by reference herein.

BACKGROUND AND SUMMARY OF THE INVENTION

The present invention relates to a particular method and a particular system for feeding a reducing agent into a catalyst device.

In addition to carbon monoxide (CO) and hydrocarbons (HC), nitrogen oxides ($NO_x$), in particular, are among the directly emitted primary pollutants which endanger the environment and which are generated during operation of internal-combustion engines, particularly diesel engines. It is not possible to use three-way catalysts, such as those used in $\lambda=1$ controlled Otto engines and gas engines, because of excessive oxygen in diesel engine exhaust gas. In order to reduce nitrogen oxide emissions in diesel engines, a selectively operating SCR-catalyst (SCR=Selective Catalytic Reduction) has therefore been developed. In this catalyst, the expelled nitrogen oxides are reduced to $N_2$ and $H_2O$ by a fed reducing agent, specifically ammonia ($NH_3$).

This manner of reducing nitrogen oxide emissions was found to be successful in stationary diesel engines. In these stationary systems, an SCR-catalyst is arranged in the exhaust gas train of the internal-combustion engine. The $NH_3$ is admixed to the exhaust gas flow in front of the SCR-catalyst by nozzle injection. In such systems, the $NH_3$ is fed as gas or as an aqueous solution. When aqueous $NH_3$ solutions are fed, thermohydrolytic splitting takes place in the exhaust gas flow or in the SCR-catalyst in order to set free the $NH_3$ required to reduce the nitrogen oxides. The reducing agent is fed by way of a metering device which is adjusted as a function of the expected $NO_x$ quantity in the exhaust gas flow of the diesel generator.

The need for caution in handling $NH_3$ as a gas or as an aqueous solution led to the approach of providing the $NH_3$ required for the $NO_x$ by feeding aqueous urea solution into the exhaust gas flow. The heat of the exhaust gas flow or of the catalyst will bring about thermohydrolytic splitting under exhaust gas of $NH_3$ as the reducing agent.

A system is known from German Patent Document DE 297 08 591 for feeding ammonia in the exhaust gas flow of an internal-combustion engine.

A method is known from German Patent Document DE 43 15 278 A1 for metering a reducing agent into a nitrogen-oxide-containing exhaust gas of an internal-combustion engine having a catalyst for reducing nitrogen oxides which is installed in an exhaust pipe. In this known method, the rate at which the reducing agent is charged into the exhaust gas is adjusted as a function of operation-relevant parameters of the exhaust gas, of the catalyst, and, optionally, of the engine.

The reducing agent, in the form of an aqueous urea solution, is stored in liquid form in a reducing-agent tank and is fed by way of a reducing-agent feed pipe to a reducing agent injection valve. The liquid reducing agent is injected by way of this reducing-agent injection valve in front of the catalyst.

One disadvantage of this known exhaust gas after treatment method is that, because of the storage and admixing of aqueous urea solution, a large mass or a large volume of the reducing agent must be carried along. This is necessary so that no refuelling with reducing agent by the customer will be required during a reasonable maintenance interval of, for example, 30,000 kilometers.

It is an object of the present invention to provide a method and a system for feeding a reducing agent into a catalyst device which require a smaller mass or a smaller volume of reducing agent to be carried along.

According to the invention, a reducing agent is fed into a catalyst device by providing a first reservoir having a solid reducing agent, providing a second reservoir having a solvent for the solid reducing agent, producing a reducing agent solution from the solid reducing agent and the solvent, intermediately storing the reducing agent solution in a third reservoir, and feeding the reducing agent solution from the third reservoir into the catalyst device.

The invention combines the advantages of a solid reducing agent, such as urea or other soluble substances which set free $NH_3$, with the simple apportioning of a liquid reducing agent.

A solid reducing agent, for example, in the form of powder, pressed parts, or monoliths, is carried along onboard. Furthermore, a corresponding solvent is either carried along in a separate tank or segregated from existing sources. An intermediate storage device is expediently provided. The reducing agent is present as a liquid solution in the intermediate storage device. The solid reducing agent and the solvent are mixed with one another by a suitable metering or mixing system in order to obtain a defined concentration. Then, as is known, the liquid reducing-agent solution is supplied to a pump and an injection valve so that the solution is metered in a controlled or regulated manner into the exhaust gas train. The customer must resupply water only if no rain water or condensate from an air-conditioner compressor or the like is available.

Advantageous further developments and improvements of the invention are reflected in various claims.

According to one preferred feature of the invention, the reducing-agent solution is produced by metered introduction of the solid reducing agent and the solvent into the third reservoir.

According to another preferred feature, the reducing-agent solution is produced by the metered introduction of the solid reducing agent and of the solvent into a mixing device provided between the first reservoir and the third reservoir. In this case, the reducing-agent solution is conducted from the mixing device into the third reservoir.

According to another preferred feature, the concentration of the reducing-agent solution is measured, and the metered introduction is controlled such that a predeterminable concentration is adjusted.

According to another preferred feature, the solid reducing agent is pulverized.

According to another preferred feature, the solid reducing agent is made available in prepressed units of mass.

According to another preferred feature, the solid reducing agent is provided as an extruded basic body.

According to another preferred feature, the basic body is dipped into the solvent or the reducing-agent solution to produce the reducing-agent solution.

According to still another preferred feature, the dipping time is determined as a function of a desired or detected concentration.

According to yet another preferred feature, the solvent is water obtained by condensation.

Embodiments of the invention are illustrated in the drawings and will be explained in detail.

DESCRIPTION OF THE PREFERRED EMBODIMENT

In the figures, the same reference number indicates identical components or components which have the same function.

In the three embodiments illustrated here, exhaust gas aftertreatment is based on an oxidation catalyst 1 close to the engine and on a reduction catalyst 2 for $NO_x$ reduction which becomes operative after the ammonia reducing operation.

Figure 1:
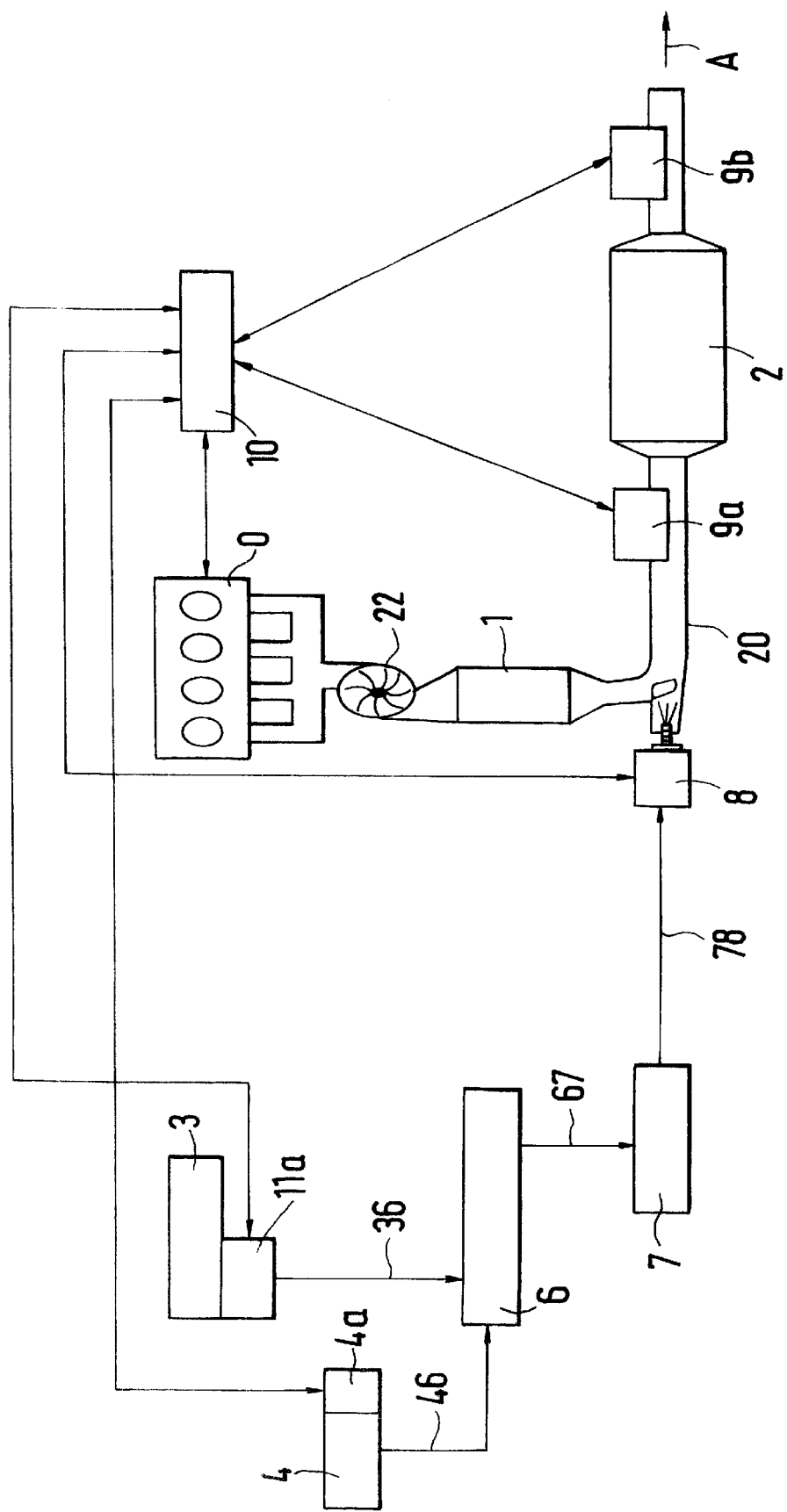
FIG. 1 is a schematic representation of an internal-combustion engine having a catalyst device and a system for feeding a reducing agent according to a first preferred embodiment of the present invention.

FIG. 1 is a schematic representation of an internal-combustion engine having a catalyst device and a system for feeding a reducing agent according to a first preferred embodiment of the present invention.

In FIG. 1, reference number 0 indicates a four-cylinder internal-combustion engine, 1 indicates an oxidation catalyst, 2 indicates a reduction catalyst, 3 indicates a reducing agent reservoir for a solid reducing agent; 4 indicates a tank for water used as the solvent for the solid reducing agent in the form of urea, which in this embodiment is a separate refillable water tank; 4a indicates a metering device for water; 11a indicates a metering device for the solid reducing agent; 6 indicates a tank for the aqueous reducing agent solution; 7 indicates a reducing agent pump; 8 indicates an injection valve; 9a and 9b indicate sensor units for detecting the temperature and the $NO_x$-content; and 10 indicates a control unit. Furthermore, 20 indicates an exhaust pipe; 22 indicates a turbocharger; A indicates the direction of the emerging purified exhaust gas; 46 indicates a pipe between the water tank 4 and the tank 6 for the reducing agent solution; 36 indicates a pipe between the reservoir tank for the solid reducing agent 3 and the tank 6 for the reducing solution; 67 indicates a pipe between the tank 6 for the reducing agent solution and the reducing agent pump 7; and 78 indicates a pipe between the reducing agent pump 7 and the injection valve 8.

The control unit 10 is connected to the valve operating mechanism or integrated therein. The control unit 10 receives information from the sensor units 9a and 9b and controls the quantity of the liquid reducing agent injected by the injection valve 8 corresponding to respective operating conditions such as load, rotational speed, temperature, or the like. In addition, the control unit 10 controls the metering device 11a for the solid reducing agent and the metering device 4a for water. These control functions are indicated by double arrows.

The processing of the solid reducing agent takes place as follows. At predetermined intervals, predetermined amounts of water and solid reducing agent, in powder form, are metered into the tank 6 for the liquid reducing agent in order to always have a reducing agent solution of a specific concentration present in the tank 6. This metering-in interval can be made a function of the level. The quantity of the solid reducing agent carried along in powder form can be dimensioned such that, as a result of the corresponding solution, a refilling interval of typically 30,000 kilometers can be achieved, whereas the amount of water is significantly lower, for example, 5 liters. The transport of the pulverized reducing agent for metering and mixing can be implemented by known devices such as, for example, a conveyer worm (utilizing Archimedes' principle), a vibrating funnel, a conveyer belt, or the like.

The metering of the liquid reducing agent into the exhaust pipe 20 takes place in a known manner by way of the reducing agent pump 7 and the injection valve 8 under the control of the control unit 10. This metering of the liquid reducing agent into the exhaust gas flow can take place particularly in a characteristic-diagram-controlled manner or, for example, by way of the $NO_x$ sensors 9a, 9b.

Figure 2:
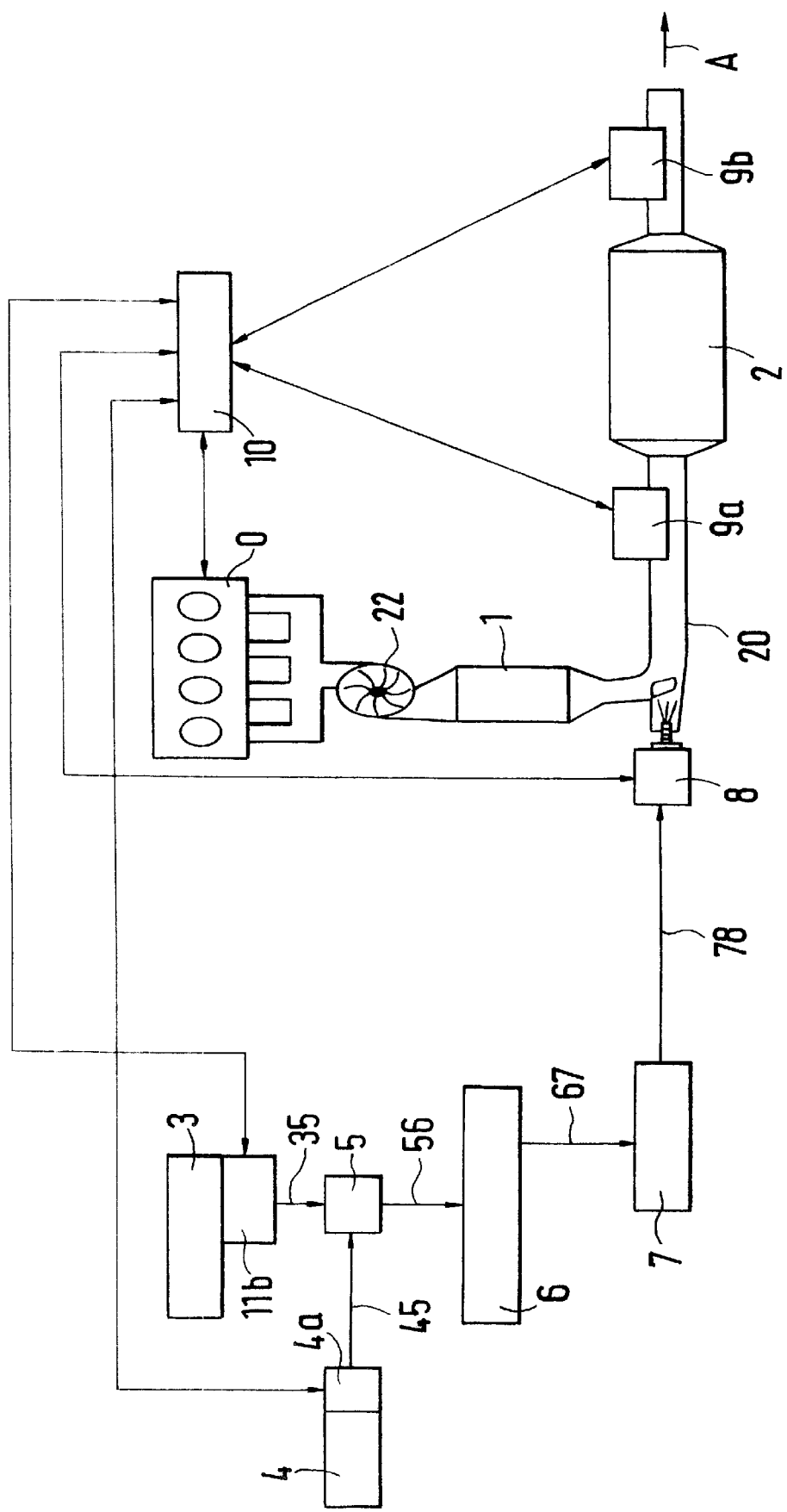
FIG. 2 is a schematic representation of an internal-combustion engine having a catalyst device and a system for feeding a reducing agent according to a second preferred embodiment of the present invention.

FIG. 2 is a schematic representation of an internal-combustion engine having a catalyst device and a system for feeding a reducing agent according to a second preferred embodiment of the present invention.

In addition to the reference numbers already introduced, in FIG. 2, 11b indicates a modified metering unit for the solid reducing agent, here present in pill form; 5 indicates an additional mixing device; 35 indicates a pipe between the reservoir 3 for the solid reducing agent and the mixing device 5; 45 indicates a pipe between the water tank 4 and the mixing device 5; and 56 indicates a pipe between the mixing device 5 and the tank for the reducing agent solution.

In this second embodiment, mixing and metering take place in the mixing device 5 before the finished reducing agent solution is conducted by way of the pipe 56 into the tank 6 for intermediately storing the reducing agent solution.

Figure 3:
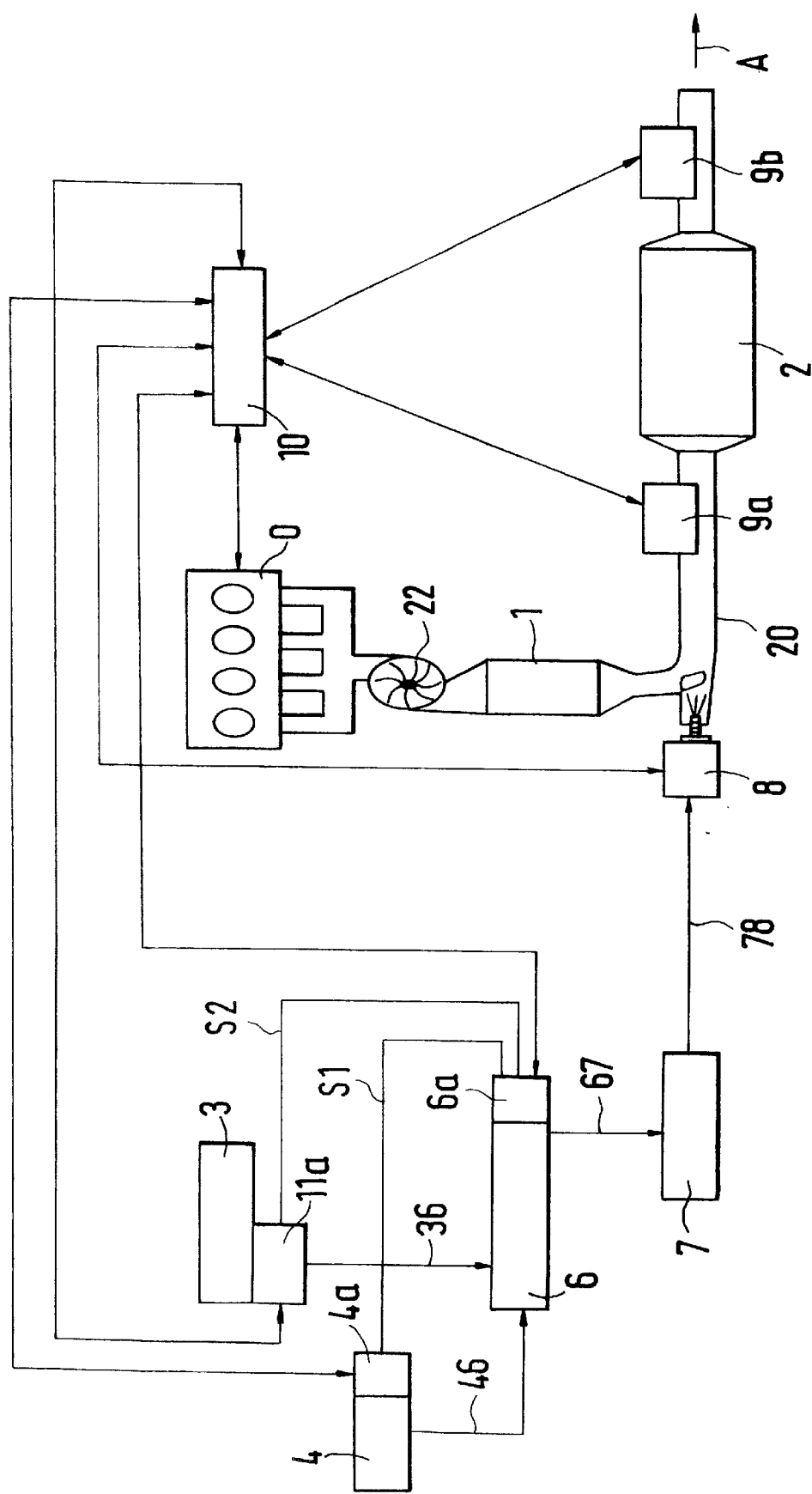
FIG. 3 is a schematic representation of an internal-combustion engine having a catalyst device and a system for feeding a reducing agent according to a third preferred embodiment of the present invention.

FIG. 3 is a schematic representation of an internal-combustion engine having a catalyst device and a system for feeding a reducing agent according to a third preferred embodiment of the present invention.

In addition to the already introduced reference numbers, in FIG. 3, reference number 6a indicates a concentration sensor in the form of a density sensor, and reference characters S1 and S2 indicate sensor lines between the concentration sensor 6a and the metering device 4a or the metering device 11a. The devices 6a, 4a and 11a are connected with the control unit.

In contrast to the first and second embodiments mentioned above, in this third embodiment, the concentration of the reducing agent solution in the tank 6 is monitored by the concentration sensor 6a. Aftermetering of water or of the solid reducing agent is initiated when this detected concentration deviates from a predetermined desired value and until the desired density has been reached. This permits a particularly precise adjustment of the concentration of the reducing agent solution.

Although the present invention was described above by way of preferred embodiments, it is not limited thereto, and can be modified in various fashions.

Although, in the above-mentioned embodiments, the required water was made available by an additional refilling tank, the invention is not limited thereto. Other possibilities include utilizing windshield wiper water, utilizing air-conditioner compressor condensation water, collecting rain water in a separate tank, or utilizing the water existing in the exhaust gas obtained by condensation.

The solid reducing agent may be present in powder form, pill form or in a monolithic fashion. The required solid reducing agent may also be metered in discrete prepressed masses (pill form) by way of a conveyer worm, a vibrating funnel or a conveyer belt, by processing parts of an extruded basic body, for example, to powder by a suitable scraper, brush or the like, and then metering the powder in by a conveyer worm, vibrating funnel or conveyer belt or by introducing an extruded basic body, for example, with a piston into the tank with the aqueous reducing agent solution, and cutting off a desired amount of reducing agent there with a cutting device (after the cutting operation, the cutting device will then close the reservoir with the solid reducing agent). The required solid reducing agent may additionally be metered by dipping a monolithic reducing agent body into the tank with the aqueous reducing agent solution until the desired conductivity/density has been achieved by dissolution of the reducing agent, or by pumping an aqueous reducing agent solution through the reducing agent tank until the desired conductivity/density has been achieved by dissolution of the reducing agent.

All other methods for metering solid materials known in the state of mechanical materials processing can also be used for processing the solid reducing agent.

For example, all substances which set free water-soluble $NH_3$, for example, urea, ammonium carbamate, ammonium carbonate, etc., can be used as the solid reducing agent.

Depending on the characteristics of the forming solution, the concentration to be adjusted can be determined, for example, by detecting electrical conductivity or another relevant parameter.

The dissolution process in the tank 6 or in the mixing chamber 5 can be promoted by heating, stirring devices or other methods known from the prior art which accelerate the dissolution process.

For solving freezing-up problems, heating of the tank or of a partial area of the tank, as well as of the pipes, the pump and the valve, can take place. Furthermore, it is possible to lower the freezing point by temperature-dependent feeding of addition agents.

In addition to monitoring to determine when the density of the reducing agent solution deviates from the desired value and, thus, a solid reducing agent or solvent has to be refilled, monitoring can take place to determine when the level of the reducing agent solution is too low per se, and the pump, the injection valve, and the catalyst can be separately monitored in the same manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A method for feeding a reducing agent into a catalyst device comprising:
   providing a first reservoir having a solid reducing agent,
   providing a second reservoir having a solvent for the solid reducing agent,
   producing a reducing agent solution from the solid reducing agent and the solvent,
   intermediately storing the reducing agent solution in a third reservoir,
   feeding the reducing agent solution from the third reservoir into the catalyst device,
   wherein production of the reducing agent solution is carried out by metered introduction of the solid reducing agent and the solvent into the third reservoir,
   wherein the solid reducing agent is provided as an extruded basic body, and
   dipping the basic body for producing the reducing agent solution into the solvent or the reducing agent solution,
   wherein a dipping time is determined as a function of a desired or detected concentration.

2. The method according to claim 1, wherein the solvent is water which is obtained by condensation.

3. A method for feeding a reducing agent into a catalyst device comprising:
   providing a first reservoir having a solid reducing agent,
   providing a second reservoir having a solvent for the solid reducing agent,
   producing a reducing agent solution from the solid reducing agent and the solvent,
   intermediately storing the reducing agent solution in a third reservoir,
   feeding the reducing agent solution from the third reservoir into the catalyst device,
   wherein production of the reducing agent solution is implemented by metered introduction of the solid reducing agent and the solvent into a mixing device provided between the first reservoir and the third reservoir, and wherein the reducing agent solution is conducted from the mixing device into the third reservoir,
   wherein the solid reducing agent is provided as an extruded basic body, and
   dipping the basic body for producing the reducing agent solution into the solvent or the reducing agent solution,
   wherein a dipping time is determined as a function of a desired or detected concentration.

4. The method according to claim 3, wherein the solvent is water which is obtained by condensation.

5. A method for feeding a reducing agent into a catalyst device comprising:
   providing a first reservoir having a solid reducing agent,
   providing a second reservoir having a solvent for the solid reducing agent,
   producing a reducing agent solution from the solid reducing agent and the solvent,
   intermediately storing the reducing agent solution in a third reservoir,
   feeding the reducing agent solution from the third reservoir into the catalyst device,
   wherein production of the reducing agent solution is carried out by metered introduction of the solid reducing agent and the solvent into the third reservoir,
   measuring a concentration of the reducing agent solution and controlling the metered introduction such that a predeterminable concentration is adjusted,
   wherein the solid reducing agent is provided as an extruded basic body, and
   dipping the basic body for producing the reducing agent solution into the solvent or the reducing agent solution,
   wherein a dipping time is determined as a function of a desired or detected concentration.

6. The method according to claim 5, wherein the solvent is water which is obtained by condensation.

7. A method for feeding a reducing agent into a catalyst device comprising:

providing a first reservoir having a solid reducing agent,
providing a second reservoir having a solvent for the solid reducing agent,
producing a reducing agent solution from the solid reducing agent and the solvent,
intermediately storing the reducing agent solution in a third reservoir,
feeding the reducing agent solution from the third reservoir into the catalyst device,
wherein production of the reducing agent solution is implemented by metered introduction of the solid reducing agent and the solvent into a mixing device provided between the first reservoir and the third reservoir, and wherein the reducing agent solution is conducted from the mixing device into the third reservoir,
measuring a concentration of the reducing agent solution and controlling the metered introduction such that a predeterminable concentration is adjusted,
wherein the solid reducing agent is provided as an extruded basic body, and
dipping the basic body for producing the reducing agent solution into the solvent or the reducing agent solution,
wherein a dipping time is determined as a function of a desired or detected concentration.

8. The method according to claim 7, wherein the solvent is water which is obtained by condensation.

* * * * *